(12) United States Patent
Zhang

(10) Patent No.: US 10,060,943 B2
(45) Date of Patent: Aug. 28, 2018

(54) SYMMETRIC MEMS PIEZOELECTRIC ACCELEROMETER FOR LATERAL NOISE

(71) Applicant: Rosemount Aerospace Inc., Burnsville, MN (US)

(72) Inventor: Weibin Zhang, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 171 days.

(21) Appl. No.: 15/074,567

(22) Filed: Mar. 18, 2016

(65) Prior Publication Data

US 2017/0269119 A1    Sep. 21, 2017

(51) Int. Cl.
*G01P 15/09* (2006.01)

(52) U.S. Cl.
CPC .................. *G01P 15/0922* (2013.01)

(58) Field of Classification Search
CPC .......... G01P 15/00; G01P 15/02; G01P 15/08; G01P 15/0802; G01P 15/0862; G01P 15/09; G01P 15/0922; G01P 15/0915; G01P 15/123; G01P 15/133; H01L 41/00; H01L 41/02; H01L 41/04; H01L 41/08; H01L 41/0825; H01L 41/0973; H01L 41/113; H01L 41/1132; H01L 41/1138
USPC ..................................................... 73/514.34
See application file for complete search history.

(56) References Cited

U.S. PATENT DOCUMENTS

| | | | | |
|---|---|---|---|---|
| 5,777,227 A | * | 7/1998 | Cho | ..................... G01P 15/0802 73/514.01 |
| 5,804,907 A | * | 9/1998 | Park | ........................ H01L 41/18 310/357 |
| 5,914,556 A | * | 6/1999 | Tabota | ................. G01P 15/0922 310/328 |
| 5,974,879 A | | 11/1999 | Hulsing, II | |

(Continued)

FOREIGN PATENT DOCUMENTS

EP    2778690 A1    9/2014
WO    2015013828 A1    2/2015

OTHER PUBLICATIONS

Extended European Search Report, for European Patent Application No. 17156924.7, dated Apr. 6, 2017, 6 pages.

*Primary Examiner* — Max Noori
(74) *Attorney, Agent, or Firm* — Kinney & Lange, P.A.

(57) ABSTRACT

Apparatus and associated methods relate to maximizing a signal to noise ratio of an accelerometer by inhibiting signals arising from movements of a proofmass in directions perpendicular to a direction of intended sensitivity. The direction of intended sensitivity of the accelerometer is along an axis of the proofmass. The accelerometer is rendered substantially insensitive to lateral accelerations of the proofmass by making the accelerometer axially symmetric. Two axially-asymmetric acceleration sensing devices are axially engaged in such a manner as to render the coupled sensing devices substantially axially-symmetric. In some embodiments, each acceleration sensor has an axially-thin membrane portion extending from a proofmass portion. The two (Continued)

acceleration sensors can be engaged in an antiparallel fashion at projecting ends of the proofmass portions. An engagement surface will be located about halfway between the axially-thin membrane portions of the two acceleration sensors, thereby causing mechanical symmetry about the engagement surface.

13 Claims, 8 Drawing Sheets

(56) References Cited

U.S. PATENT DOCUMENTS

| | | | |
|---|---|---|---|
| 6,035,714 A | 3/2000 | Yazdi et al. | |
| 6,336,366 B1 * | 1/2002 | Thundat | G01H 3/08 |
| | | | 310/331 |
| 6,792,806 B2 * | 9/2004 | Ishikawa | G01P 15/097 |
| | | | 73/514.34 |
| 6,796,181 B2 * | 9/2004 | Tanaka | G01P 15/0922 |
| | | | 310/329 |
| 7,021,141 B1 * | 4/2006 | Nilsson | G01P 1/023 |
| | | | 73/514.29 |
| 8,191,420 B2 | 6/2012 | Wilner et al. | |
| 8,516,889 B2 | 8/2013 | Simoni et al. | |
| 8,839,670 B2 | 9/2014 | Qiu et al. | |
| 8,915,139 B1 | 12/2014 | McConnell | |
| 8,919,199 B2 | 12/2014 | Judy et al. | |
| 9,003,885 B2 | 4/2015 | Pan et al. | |
| 9,400,337 B2 * | 7/2016 | Jones | G01P 15/09 |
| 2008/0072677 A1 * | 3/2008 | Rhee | G01P 15/0922 |
| | | | 73/652 |
| 2012/0227274 A1 * | 9/2012 | Watanabe | G01C 9/06 |
| | | | 33/365 |
| 2012/0326566 A1 * | 12/2012 | Koyama | G01P 15/097 |
| | | | 310/338 |
| 2014/0269203 A1 * | 9/2014 | Jones | G01P 15/09 |
| | | | 367/135 |
| 2015/0114118 A1 | 4/2015 | Che et al. | |
| 2016/0018435 A1 | 1/2016 | Kwa | |

* cited by examiner

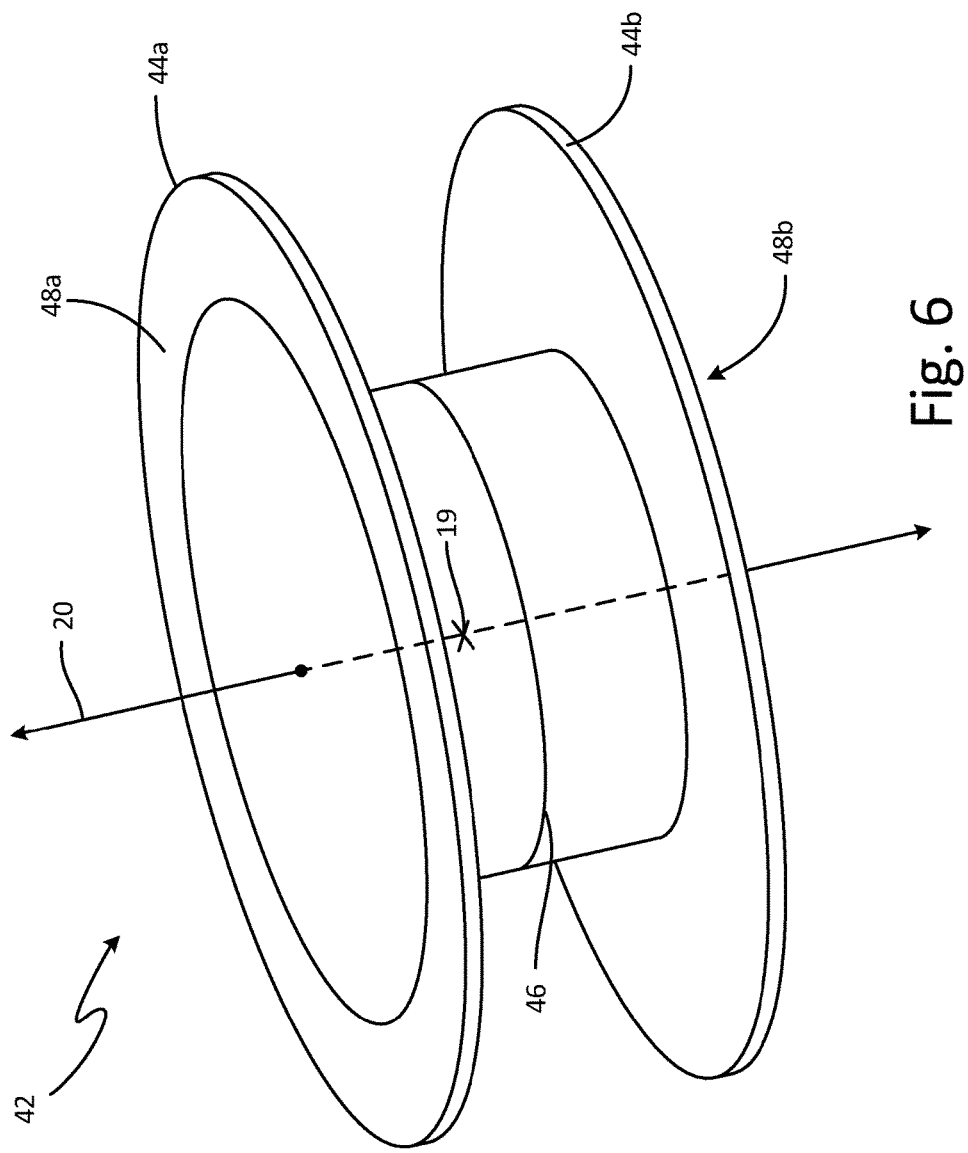

SYMMETRIC MEMS PIEZOELECTRIC ACCELEROMETER FOR LATERAL NOISE

BACKGROUND

Piezoelectric accelerometers may be made using various components and geometries. Some piezoelectric accelerometers use piezoelectric sensing elements mounted to an elastic membrane. Piezoelectric transducers are used to sense a mechanical deformation of the elastic membrane and generate an electrical signal indicative of the mechanical deformation. Piezoelectric transducers can produce a voltage, a current, or a charge in response to changes in pressure, acceleration, temperature, strain, or force, etc. Such transducers can be used to monitor processes or deformable members. Some piezoelectric transducers are configured to generate an electric signal only in response to accelerations in a specific direction.

Piezoelectric accelerometers may have a proofmass attached to an elastic membrane. The elastic membrane is configured to span from the proofmass to a device to be acceleration tested. When the device under test is accelerated, inertia of the proofmass will cause the proofmass to move in a dissimilar fashion than the movement of the accelerating device under test. Because of this dissimilar movement, the elastic membrane spanning between the proofmass and the device under test, may distort. This distortion may be sensed by the piezoelectric transducer and converted into an electric signal indicative of such a distortion.

Accelerometers may be axially asymmetric, even for devices intended to sense only or primarily axial accelerations. For example, an axially-thin elastic membrane may laterally extend from a first axial end of the proofmass. A second axial end of the proofmass may project away from the axially-thin elastic member. A lateral force acting upon the accelerometer can cause the proofmass to become canted with respect to the axially-thin elastic membrane, to which it is attached. Such canting of the proofmass can cause the axially-thin elastic membrane to deform. Such a deformation may be detected by a piezoelectric transducer mounted on the axially-thin elastic membrane, thereby causing a signal indicative of acceleration, albeit a lateral acceleration. In some applications, suppressing lateral accelerations may improve the signal-to-noise ration of axial acceleration measurements.

SUMMARY

A piezoelectric accelerometer includes a first acceleration sensor. The first acceleration sensor includes a first proofmass. The first acceleration sensor includes a first axially-thin membrane portion coupled to the first proofmass. The first acceleration sensor also includes a first piezoelectric transducer on the first membrane portion. The first acceleration sensor is axially asymmetric. The piezoelectric accelerometer also includes a second acceleration sensor axially engaged with the first acceleration sensor. The second acceleration sensor includes a second proofmass. The second acceleration sensor also includes a second axially-thin membrane portion coupled to the second proofmass. The second acceleration sensor is axially asymmetric.

A method for maximizing a lateral movement rejection ratio of an accelerometer includes affixing a device under test to a first axial end of a proofmass via an axially-deformable member. The method includes inhibiting a movement in directions parallel to a first lateral line of the first axial end of a proofmass. The method includes inhibiting a movement in directions parallel to a second lateral line of a second axial end of a proofmass. The method includes sensing a deformation of the axially-deformable member.

BRIEF DESCRIPTION OF THE DRAWINGS

FIG. 6 is a perspective view of an exemplary accelerometer configured to suppress signals resulting from lateral forces.

DETAILED DESCRIPTION

Figure 1:
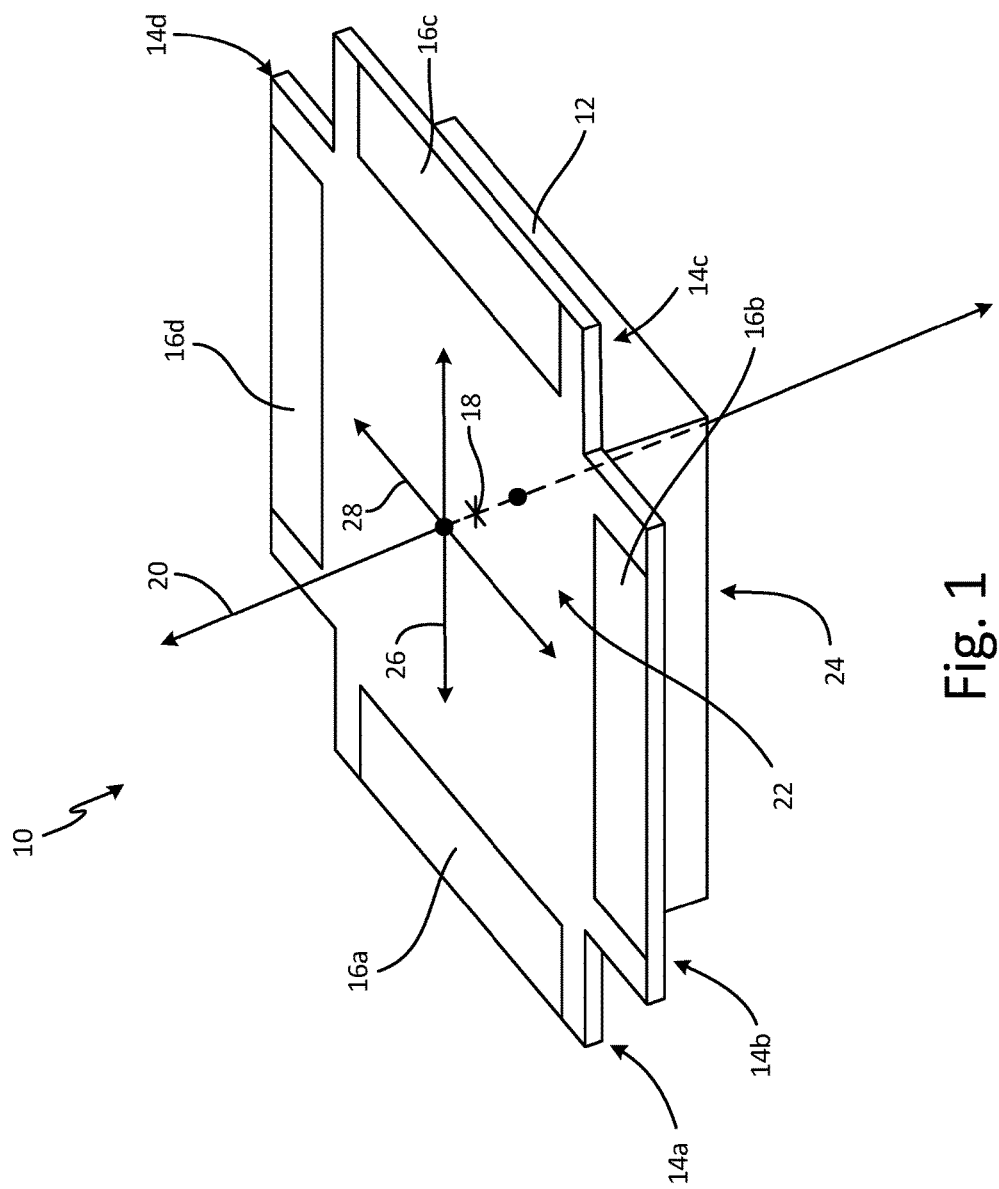
FIG. 1 is a perspective view of half of an exemplary accelerometer that is configured to be axially coupled to an identical half accelerometer.

FIG. 1 is a perspective view of half of an exemplary accelerometer that is configured to be axially coupled to an identical half accelerometer. In FIG. 1, axially-asymmetric accelerometer 10 includes proofmass 12 and axially-thin elastic membranes 14a-d. Piezoelectric transducers 16a-d are affixed to axially-thin elastic membranes 14a-d. Proofmass 12 has center of mass 18 along an axis 20 extending between a first axial end 22 and a second axial end 24.

Axially-thin elastic membranes 14a and 14c extend in opposite lateral directions along first lateral line 26 from first axial end 22 of proofmass 12. Axially-thin elastic membranes 14b and 14d extend in opposite lateral directions along second lateral line 28 from first axial end 22 of proofmass 12. Accelerometer 10 is configured to measure accelerations parallel to axis 20 of proofmass 12.

Figure 2A:
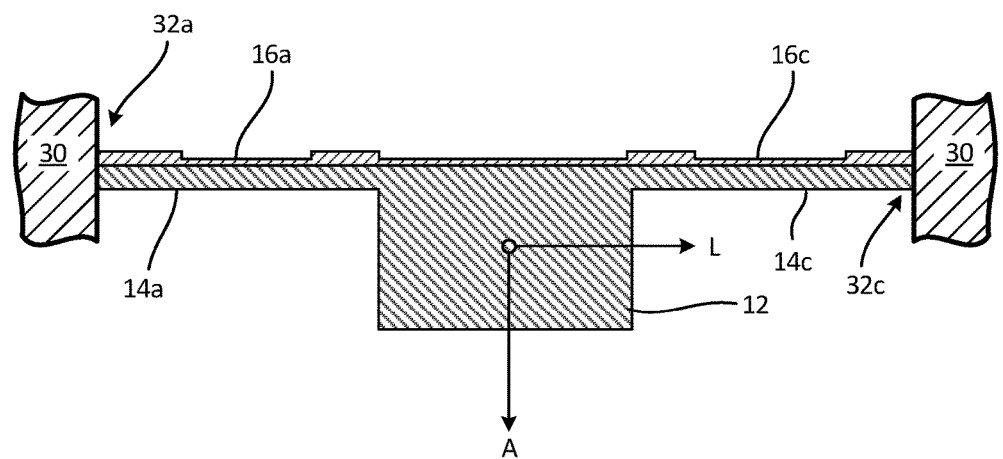
FIG. 2A is a side elevation view of the exemplary accelerometer depicted in FIG.

FIG. 2A is a side elevation view of the exemplary accelerometer depicted in FIG. 1. In FIG. 2A, piezoelectric sensing film 16a, 16c are deposited on top of elastic membranes 14a, 14c, respectively. Piezoelectric sensing film 16a, 16c can be patterned such that they are located at locations, such as at locations A-D, where stress can result from axial accelerations. Superimposed on accelerometer 10 of FIG. 2A are lateral axis L and axial axis A. Lateral axis L defines a lateral dimension parallel to first lateral line 26 (shown in FIG. 1) which defines the directions that axially-thin elastic membranes 14a, 14c extend from proofmass 12. Axial axis A is collinear with axis 20 depicted in FIG. 1. Axially-thin elastic membranes 14a, 14c are attached to device under test 30 at lateral ends 32a, 32c of axially-thin elastic membranes 14a, 14c, respectively. Axially-thin elastic membranes 14a, 14c span a space between device under test 30 and proofmass 12.

Figure 2B:
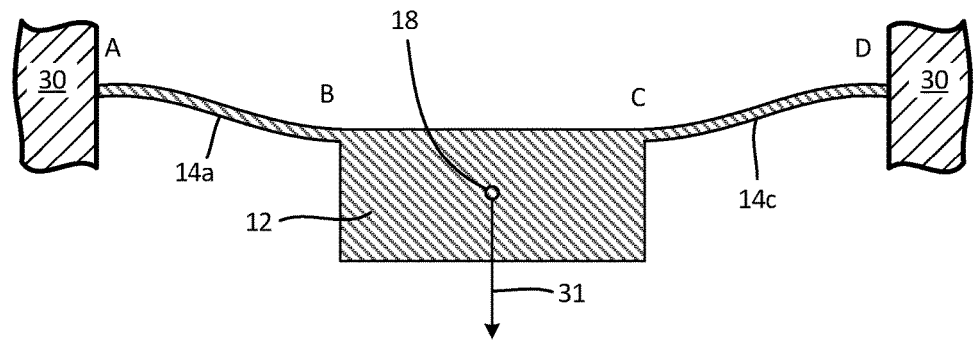
FIG. 2B is a side elevation view of the exemplary accelerometer depicted in FIG. 1 during an axial acceleration event.

FIG. 2B is a side elevation view of the exemplary accelerometer depicted in FIG. 1 during an axial acceleration event. In FIG. 2B, proofmass 12 is shown responding to an axial acceleration, indicated by axial acceleration vector 31. Because elastic membranes 14a, 14c are axially thin compared to the lateral dimensions, an axial acceleration can create large bending stresses at certain locations of axially-thin elastic membranes 14a, 14c, such as at locations A-D. These bending stresses can create electrical signal outputs by piezoelectric sensing film 16a, 16c.

Figure 2C:
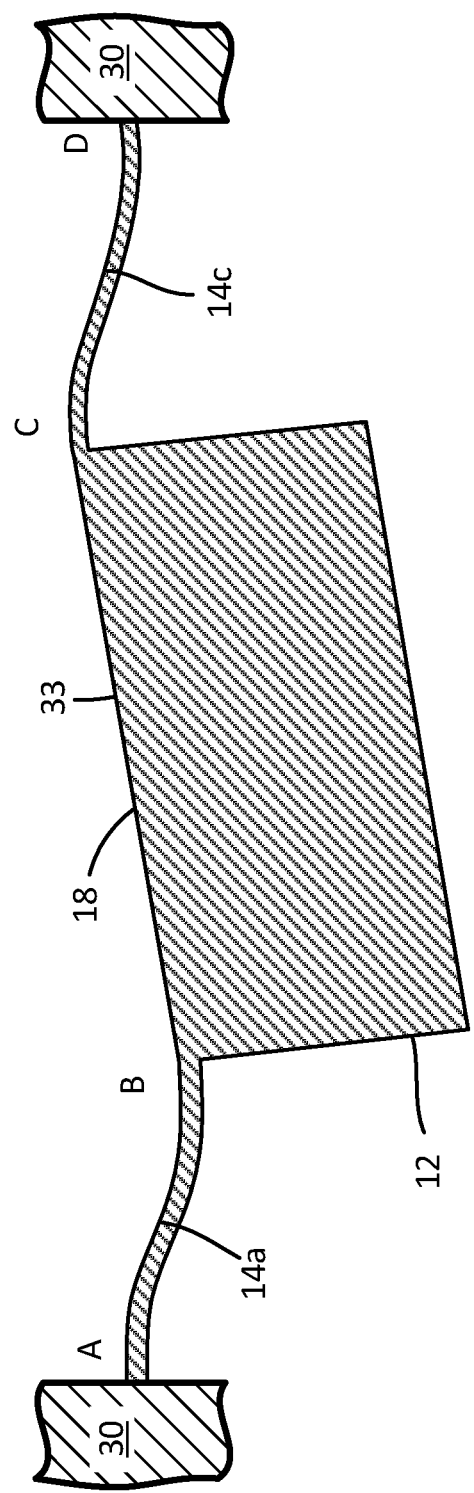
FIG. 2C is a side elevation view of the exemplary accelerometer depicted in FIG. 1 during a lateral acceleration event.

FIG. 2C is a side elevation view of the exemplary accelerometer depicted in FIG. 1 during a lateral acceleration event, indicated by lateral acceleration vector 33. In FIG. 2C, proofmass 12 is shown responding to a lateral acceleration. Superimposed on accelerometer 10 of FIG. 2C is a vector depicting inertia vector 33 originating at center of mass 18 of proofmass 12 and extending along lateral axis 26 (depicted in FIG. 2A). Because center of mass 18 is not coplanar with axially-thin elastic membranes 14a, 14b, a lateral acceleration of proofmass 12 can cause bending stresses of top of elastic membranes 14a-c. These bending stresses can create electrical signal outputs by piezoelectric sensing film 16a-c.

For accelerometers designed for measuring accelerations in directions parallel to axial axis 20 in FIG. 2B, electrical signal outputs by piezoelelctric sensing film 16a-c can be considered as noise. Therefore, minimizing such electrical signal outputs can improve sensing of axial accelerations. Simulations for a specific configuration of an axially-asymmetric accelerometer were performed. Simulations of both a lateral acceleration and an axial acceleration were conducted. Results of these simulations on such an axially-asymmetric accelerometer, such as accelerometer 10, yield the following sensitivities: i) piezoelectric sensor 16a, 16c will generate a 1.03 mVolt signal in response to a 1 gram axial acceleration; ii) piezoelectric sensors 16a, 16c will generate a 0.26 mVolt signal in response to a 1 gram lateral acceleration. This simulation represents only a modest 75% lateral rejection ratio. Various specific axially-asymmetric accelerometer geometries will result in various different specific sensitivities.

Figure 3:
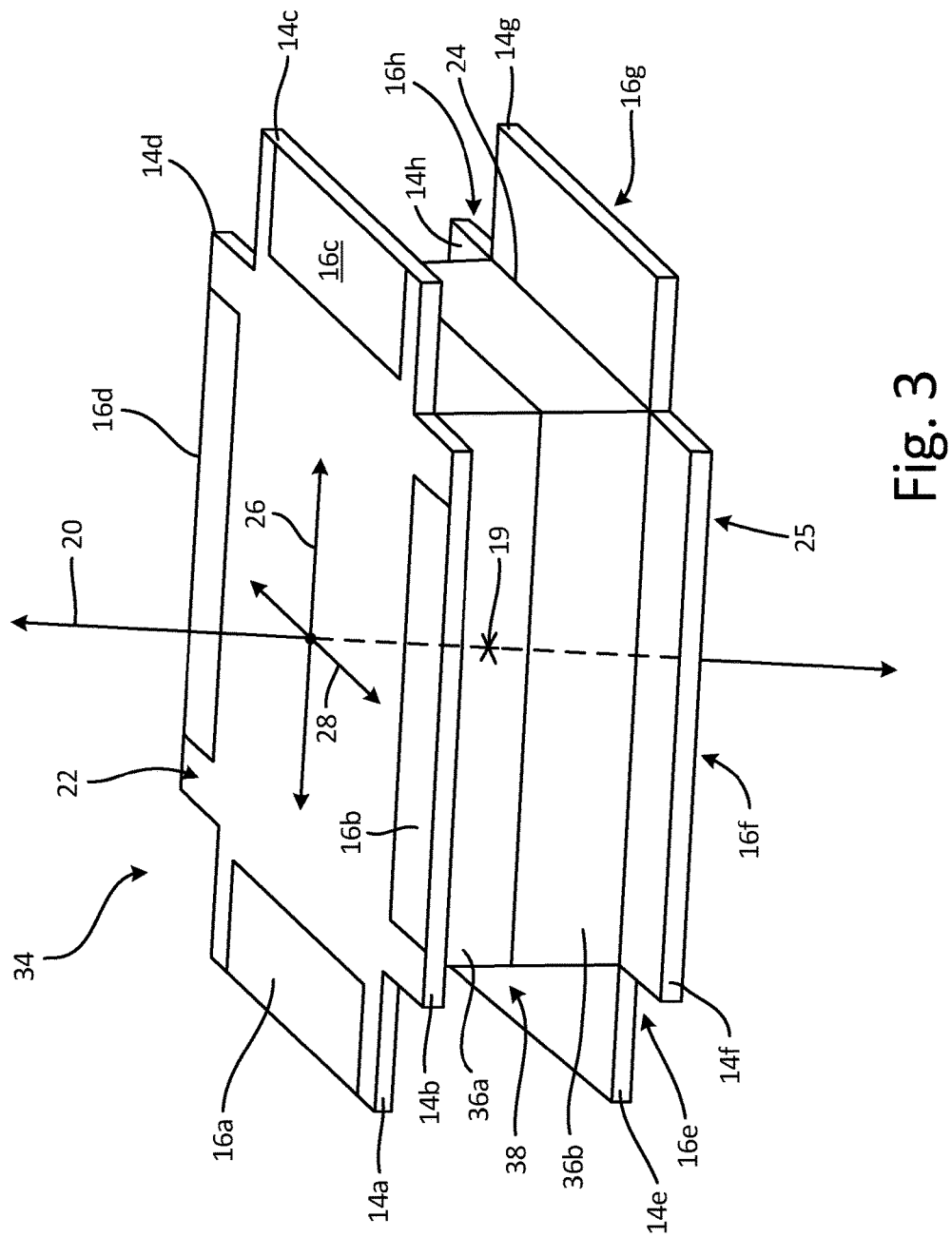
FIG. 3 is a perspective view of an exemplary accelerometer configured to suppress signals resulting from lateral forces.

FIG. 3 is a perspective view of an exemplary accelerometer configured to suppress signals resulting from lateral acceleration. In FIG. 3, axially-symmetric accelerometer 34 which is made by axially connecting two of accelerometers 10 in an antiparallel fashion at second axial ends 24 of proofmasses 12 (as depicted in FIG. 1). Each of accelerometer 10 will now be considered one of accelerometer half 36a or 36b. Various means for axially engaging second axial ends 24 of proofmasses 12 from accelerometer halves 36a, 36b may be used. For example, an adhesive may be used to axially engage second axial ends 24 of proofmasses 12. In an exemplary embodiment, second axial end 24 may engage one another due to affixing lateral ends of axially-thin elastic membranes 16a-h to a device under test in locations that maintain engagement of second axial ends 24 of proofmasses 12.

Axially-symmetric accelerometer 34 includes proofmass 38, which includes proofmasses 12 of accelerometer halves 36a, 36b. Axially-symmetric accelerometer 34 also includes axially-thin elastic membranes 14a-h. Piezoelectric transducers 16a-h are affixed to axially-thin elastic membranes 14a-h. Proofmass 38 has center of mass 19 along an axis 20 extending between a first axial end 22 and a second axial end 25.

Axially-thin elastic membranes 14a and 14c extend in opposite lateral directions along first lateral line 26 from first end 22 of the proofmass 12. Axially-thin elastic membranes 14b and 14d extend in opposite lateral directions along second lateral line 28 from first axial end 22 of proofmass 38. Accelerometer 34 is configured to measure accelerations parallel to axis 20 of proofmass 38.

Figure 4A:
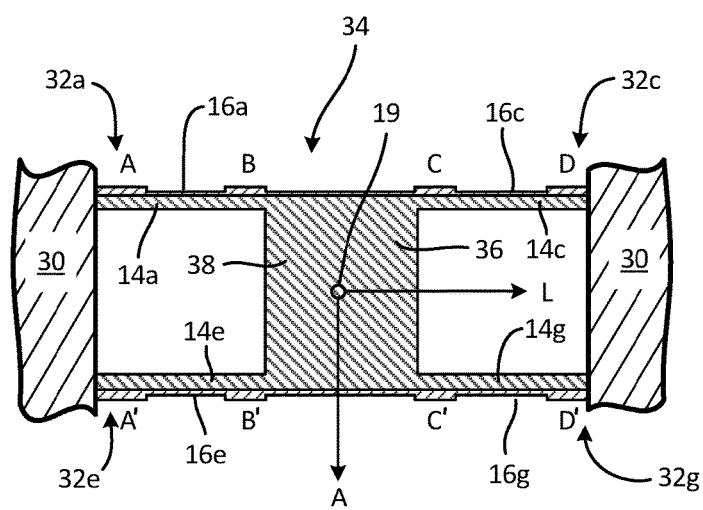
FIG. 4A is a side elevation view of the exemplary accelerometer depicted in FIG. 3.

FIG. 4A is a side elevation view of the exemplary accelerometer depicted in FIG. 3. Superimposed on accelerometer 34 of FIG. 4A are lateral axis L and axial axis A. Lateral axis L defines a lateral dimension parallel to first lateral line 26 (shown in FIG. 1) which defines the directions that axially-thin elastic membranes 14a, 14c, 14e, 14g extend from proofmass 38. Axial axis A is collinear with axis 20 depicted in FIG. 1. Axially-thin elastic membranes 14a, 14c, 14e, 14g are attached to device under test 30 at lateral ends 32a, 32c, 32e, 32g of axially-thin elastic membranes 14a, 14c, 14e, 14g respectively. Axially-thin elastic membranes 14a, 14c, 14e, 14g span a space between device under test 30 and proofmass 38.

Figure 4B:
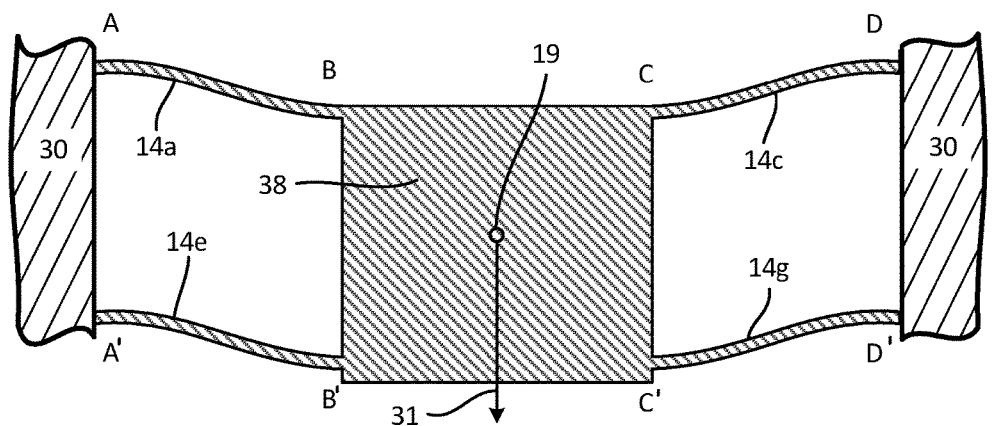
FIG. 4B is a side elevation view of the exemplary accelerometer depicted in FIG. 3 during an axial acceleration event.

FIG. 4B is a side elevation view of the exemplary accelerometer depicted in FIG. 3 during an axial acceleration event. In FIG. 4B, proofmass 12 is shown responding to an axial acceleration, as indicated by vector 31. Because elastic membranes 14a, 14c, 14e, 14g are axially thin compared to the lateral dimensions, an axial acceleration can create large bending stresses at certain locations of axially-thin elastic membranes 14a, 14c, 14e, 14g such as at locations A-D, A'-D'. These bending stresses can create electrical signal outputs by piezoelectric sensing elements 16a, 16c, 16e, 16g.

Figure 4C:
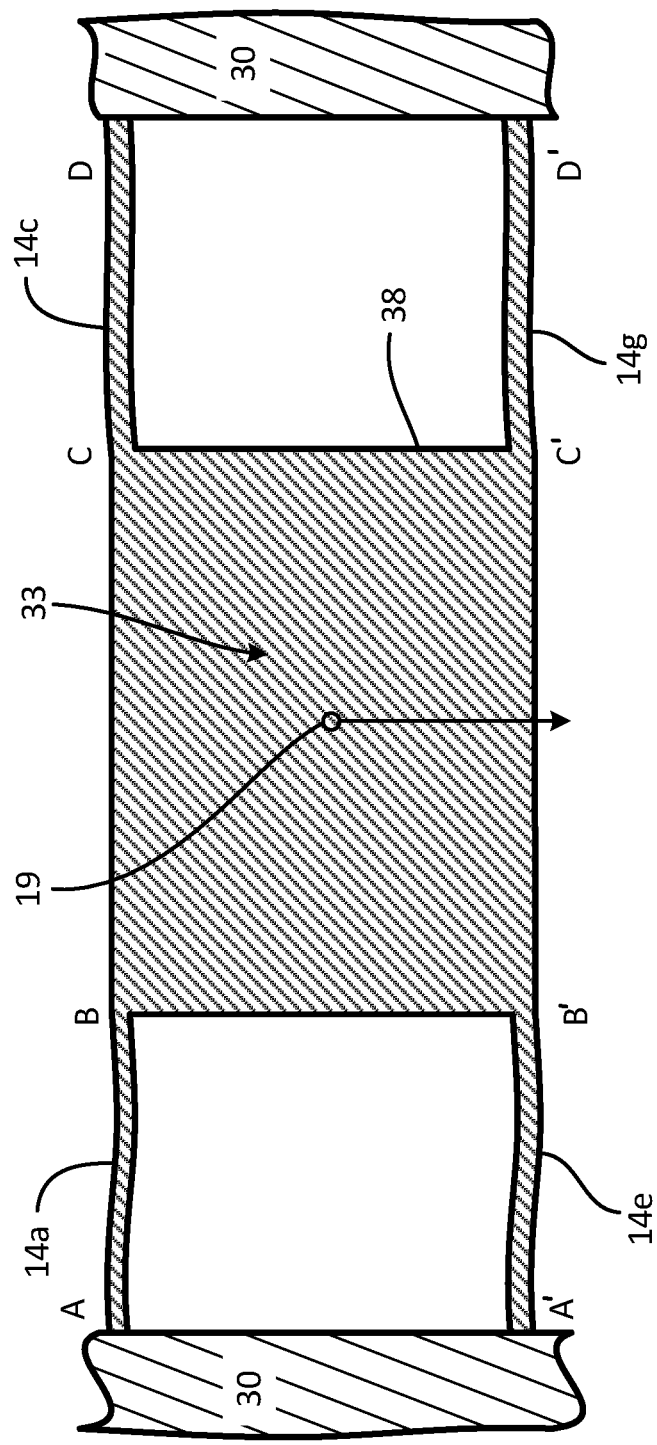
FIG. 4C is a side elevation view of the exemplary accelerometer depicted in FIG. 3 during a lateral acceleration event.

FIG. 4C is a side elevation view of the exemplary accelerometer depicted in FIG. 3 during a lateral acceleration event. In FIG. 4C, accelerometer 34 is again shown in side elevation view, but instead of an axial acceleration, proofmass 38 is shown responding to a lateral acceleration. Superimposed on accelerometer 34 of FIG. 4C is a vector depicting inertia vector 33 originating at center of mass 19 of proofmass 38 and extending in a direction parallel to lateral axis L (depicted in FIG. 4A). Because center of mass 19 is halfway between axially-thin elastic membranes 14a, 14c and axially-thin membranes 14e, 14g, canting of proofmass 38 is inhibited in response to a lateral acceleration. Thus, little bending deformation of axially-thin elastic membranes 14a, 14c, 14e, 14g will result.

Simulations for a specific configuration of an axially-symmetric accelerometer were performed. Simulations of both a lateral acceleration and an axial acceleration were conducted. Results of these simulations on such an axially-symmetric accelerometer, such as accelerometer 34, yield the following sensitivities: i) piezoelectric sensor 16a, 16c, 16e, 16g will again generate a 1.03 mVolt signal in response to a 1 gram axial acceleration; ii) piezoelectric sensors 16a, 16c, 16e, 16g will generate a 0.016 mVolt signal in response to a 1 gram lateral acceleration. This simulation represents only a modest 98.5% lateral rejection ratio. Various specific axially-symmetric accelerometer geometries will result in various different specific sensitivities.

Figure 5A:
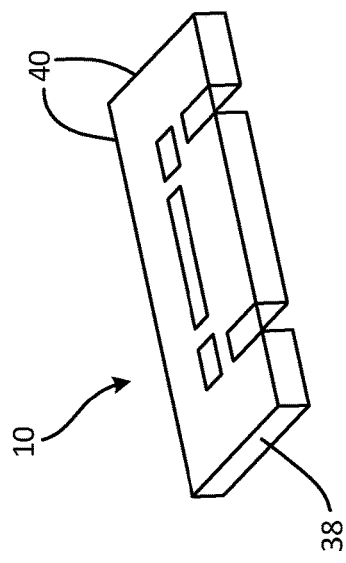
FIGS. 5A-5D are perspective views of the exemplary accelerometers depicted in FIGS. 1-2 shown with peripheral attachment regions.
Figure 5B:
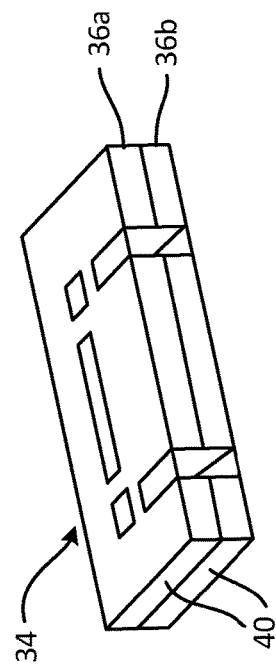
Figure 5C:
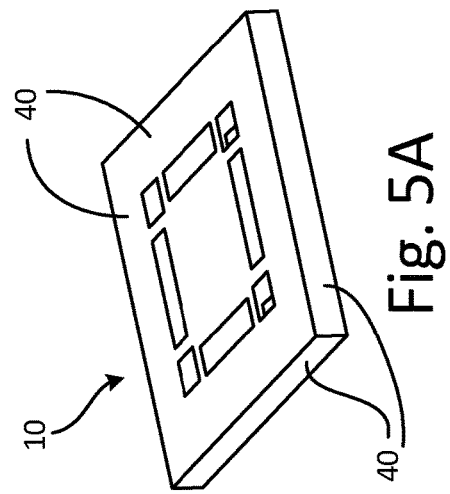
Figure 5D:
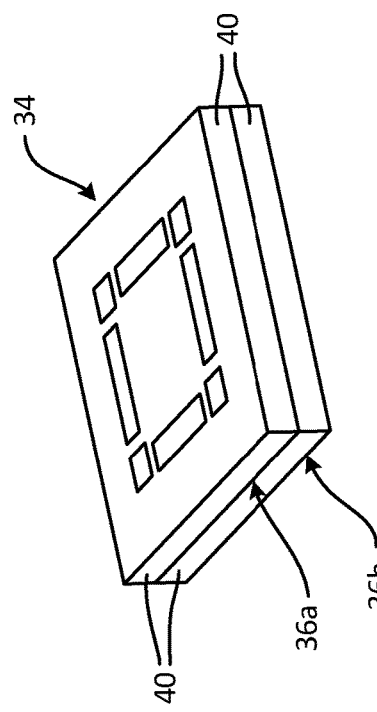

FIGS. 5A-5D are perspective views of the exemplary accelerometers depicted in FIGS. 1-4 shown with peripheral attachment regions. In FIGS. 5A-5B, accelerometer half 36a or 36b is depicted with peripheral attachment regions 40. In FIGS. 5C-5D accelerometer 34 is depicted with peripheral attachment regions 40. Peripheral attachment regions 40 can facilitate attachment of accelerometer 34 to a device under test.

FIG. 6 is a perspective view of an exemplary accelerometer configured to suppress signals resulting from lateral acceleration. In FIG. 6, a cylindrically symmetrical embodiment of axially symmetric accelerometer 42 is shown. Axially-symmetric accelerometer 42 has both axis 20 of lateral symmetry and center or mass 19 of axial mirror symmetry. Axially-thin annular elastic membranes 44a, 44b laterally extend from proofmass 46. Piezoelectric sensors 48a, 48b are attached to axially-thin annular elastic membranes 44a, 44b.

The following are non-exclusive descriptions of possible embodiments of the present invention.

A piezoelectric accelerometer includes a first acceleration sensor. The first acceleration sensor includes a first proofmass. The first acceleration sensor includes a first axially-thin membrane portion coupled to the first proofmass. The first acceleration sensor also includes a first piezoelectric transducer on the first membrane portion. The first acceleration sensor is axially asymmetric. The piezoelectric accelerometer also includes a second acceleration sensor axially engaged with the first acceleration sensor. The second acceleration sensor includes a second proofmass. The second acceleration sensor also includes a second axially-thin membrane portion coupled to the second proofmass. The second acceleration sensor is axially asymmetric.

A further embodiment of the foregoing piezoelectric accelerometer, wherein the first proofmass of the first acceleration sensor can be securely engaged with the second proofmass of the second acceleration sensor so as to form a combined proofmass. A further embodiment of any of the foregoing piezoelectric accelerometers, wherein the first axially-thin membrane portion of the first acceleration sensor can define a first plane, and the second axially-thin membrane portion of the second acceleration sensor can define a second plane, and wherein a center of mass of the combined proofmass can be between the first plane and the second plane. A further embodiment of any of the foregoing piezoelectric accelerometers, wherein the combined proofmass is axially symmetric about the center of mass.

A further embodiment of any of the foregoing piezoelectric accelerometers, wherein the second acceleration sensor further includes a second piezoelectric transducer on the second membrane portion. A further embodiment of any of the foregoing piezoelectric accelerometers, wherein the second acceleration sensor can be identical to the first accelerometer sensor. A further embodiment of any of the foregoing piezoelectric accelerometers, wherein the first and second acceleration sensors can be axially engaged in an anti-parallel orientation such that the piezoelectric accelerometer has symmetry about a symmetry point located at an interface between the first and second acceleration sensors.

A further embodiment of any of the foregoing piezoelectric accelerometers, wherein the engagement of the first and second acceleration sensors can be realized by direct wafer bonding or chip bonding. A further embodiment of any of the foregoing piezoelectric accelerometers, wherein the engagement of the first and second acceleration sensors can be realized by wafer bonding or chip bonding with at least one intermedium layer. A further embodiment of any of the foregoing piezoelectric accelerometers, wherein the engagement of the first and second acceleration sensors can be realized by an adhesive. A further embodiment of any of the foregoing piezoelectric accelerometers, wherein each of the first and second axially-thin membrane portions can laterally project from the first and second proofmasses, respectively.

A further embodiment of any of the foregoing piezoelectric accelerometers, wherein each of the first and second acceleration sensors have rotational symmetry. A further embodiment of any of the foregoing piezoelectric accelerometers, wherein rotational symmetry is 180 degree rotational symmetry. A further embodiment of any of the foregoing piezoelectric accelerometers, wherein rotational symmetry is 90 degree rotational symmetry.

A method for maximizing an lateral movement rejection ratio of an accelerometer includes affixing a device under test to a first axial end of a proofmass via an axially-deformable member. The method includes inhibiting a movement in directions parallel to a first lateral line of the first axial end of a proofmass. The method includes inhibiting a movement in directions parallel to a second lateral line of a second axial end of a proofmass. The method includes sensing a deformation of the axially-deformable member.

The method of the preceding paragraph can optionally include, additionally and/or alternatively, any one or more of the following features, configurations and/or additional components: i) generating a signal indicative of acceleration based on the sensed deformation of the axially-deformable member; and/or ii) engaging a first proofmass portion of a first axially-asymmetric accelerometer to a second proofmass portion of a second axially-asymmetric accelerometer.

A further embodiment of any of the foregoing methods, wherein the affixing a device under test to a first axial end of a proofmass can include affixing laterally opposite attachment end portions of the axially-deformable member to the accelerating testing device. A further embodiment of any of the foregoing methods, wherein the axially deformable member can be a first axially deformable member, and the method can further includes affixing the device under test to a second axial end of the proofmass via an second axially-deformable member. A further embodiment of any of the foregoing methods, wherein affixing a device under test to a first axial end of a proofmass can include affixing a periphery of the axially-deformable member to the accelerating testing device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piezoelectric accelerometer comprising:
    a first acceleration sensor including:
        a first axis;
        a first proofmass having an axis coincident with the first axis;
        a first axially-thin membrane portion coupled to and laterally extending from a first lateral end of the first proofmass; and
        a first piezoelectric transducer on the first membrane portion,
        wherein the first acceleration sensor is axially asymmetric, and a second acceleration sensor including:
   a second axis;
   a second proofmass having an axis coincident with the second axis; and
   a second axially-thin member portion coupled to and laterally extending from a first lateral end of the second proofmass;
   wherein the second acceleration sensor is axially asymmetric, and
   wherein the first and second acceleration sensors are mechanically coupled to one another at second lateral ends of the first and second acceleration sensors such that the first axis is coincident with the second axis.

2. The piezoelectric accelerometer of claim 1, wherein the first proofmass of the first acceleration sensor is mechanically coupled with the second proofmass of the second acceleration sensor so as to form a combined proofmass.

3. The piezoelectric accelerometer of claim 2, wherein the first axially-thin member portion of the first acceleration sensor defines a first plane, and the second axially-thin member portion of the second acceleration sensor defines a second plane, and wherein a center of mass of the combined proofmass is between the first plane and the second plane.

4. The piezoelectric accelerometer of claim 3, wherein the combined proofmass is axially symmetric about the center of mass.

5. The piezoelectric accelerometer of claim 1, wherein the second acceleration sensor further includes:

a second piezoelectric transducer on the second membrane portion.

6. The piezoelectric accelerometer of claim 5, wherein the second acceleration sensor is identical to the first acceleration sensor.

7. The piezoelectric accelerometer of claim 6, wherein the first and second acceleration sensors are mechanically coupled in an anti-parallel orientation such that the piezoelectric accelerometer has symmetry about a symmetry point located at an interface between the first and second acceleration sensors.

8. The piezoelectric accelerometer of claim 1, wherein the first acceleration sensor is mechanically coupled to the second acceleration sensor via direct wafer bonding or chip bonding.

9. The piezoelectric accelerometer of claim 1, wherein the first acceleration sensor is mechanically coupled to the second acceleration sensor via wafer bonding or chip bonding with at least one intermedium layer.

10. The piezoelectric accelerometer of claim 1, wherein the first acceleration sensor is mechanically coupled to the second acceleration sensor via an adhesive.

11. The piezoelectric accelerometer of claim 1, wherein each of the first and second acceleration sensors have rotational symmetry.

12. The piezoelectric accelerometer of claim 11, wherein rotational symmetry is 180 degree rotational symmetry.

13. The piezoelectric accelerometer of claim 11, wherein rotational symmetry is 90 degree rotational symmetry.

* * * * *